(12) United States Patent
Nair

(10) Patent No.: US 9,304,745 B2
(45) Date of Patent: Apr. 5, 2016

(54) PRODUCT-APPLICATION-SOLUTION (PAS) MODEL FOR SOFTWARE DESIGN AND DEVELOPMENT

(75) Inventor: Nandakumar Krishnan Nair, Trivandrum (IN)

(73) Assignee: NANDAKUMAR KRISHNAN NAIR, Trivandrum (IN)

( * ) Notice: Subject to any disclaimer, the term of this patent is extended or adjusted under 35 U.S.C. 154(b) by 1350 days.

(21) Appl. No.: 12/478,967

(22) Filed: Jun. 5, 2009

(65) Prior Publication Data
US 2010/0293520 A1 Nov. 18, 2010

(51) Int. Cl.
G06F 9/44 (2006.01)
G06Q 10/00 (2012.01)

(52) U.S. Cl.
CPC .. *G06F 8/35* (2013.01); *G06F 8/10* (2013.01); *G06F 8/20* (2013.01); *G06F 8/24* (2013.01); *G06Q 10/00* (2013.01)

(58) Field of Classification Search
USPC .......................................... 717/102
See application file for complete search history.

(56) References Cited

U.S. PATENT DOCUMENTS

| | | | |
|---|---|---|---|
| 8,095,472 B2* | 1/2012 | Springborn et al. .......... | 705/301 |
| 2003/0188291 A1* | 10/2003 | Fisher ........................... | 717/102 |
| 2005/0021348 A1* | 1/2005 | Chan et al. ..................... | 705/1 |
| 2005/0216890 A1* | 9/2005 | Sundararajan et al. ........ | 717/120 |
| 2006/0174222 A1* | 8/2006 | Thonse et al. ................. | 717/106 |
| 2008/0071908 A1* | 3/2008 | Nair et al. ...................... | 709/226 |
| 2008/0127052 A1* | 5/2008 | Rostoker ........................ | 717/105 |
| 2008/0313596 A1* | 12/2008 | Kreamer et al. ............... | 717/101 |
| 2009/0055796 A1* | 2/2009 | Springborn et al. ........... | 717/102 |
| 2009/0077531 A1* | 3/2009 | Miloslavsky et al. .......... | 717/100 |

OTHER PUBLICATIONS

Kwanwoo Lee, Kyo C. Kang, and Jaejoon Lee. "Concepts and Guidelines of Feature Modeling for Product Line Software Engineering." Software Reuse: Methods, Techniques, and Tools. LNCS vol. 2319. 2002. pp 62-77.*

* cited by examiner

*Primary Examiner* — Lewis A Bullock, Jr.
*Assistant Examiner* — Mark Gooray
(74) *Attorney, Agent, or Firm* — Barry Choobin; Patent 360 LLC

(57) ABSTRACT

The various embodiments of the present invention provide a PAS model for software design and development with a product layer including basic product level business objects (BO) to provide a basic functionality offered by software. An application layer is built on the product layer to include the application level business objects to provide inputs for a solution required by a user and to achieve desired business requirements. A solution layer is built on the application layer to include the solution level business object to address the specific business requirement of the user. The solution level business object is created using the application level business objects which is in turn created using the product level business objects to provide solution to meet the specific business requirement of the user.

17 Claims, 5 Drawing Sheets

PRODUCT-APPLICATION-SOLUTION (PAS) MODEL FOR SOFTWARE DESIGN AND DEVELOPMENT

BACKGROUND

1. Technical Field

The embodiments herein generally relate to design and development of the software and particularly relates to a three layered operational model used for the design and development of the software developed by product based enterprises.

2. Description of the Related Art

Today, the product based enterprises and corporate firms operating in multiple industry verticals are struggling hard to implement solutions to different customers from a single base product. Whenever a new client is acquired, the project team is falling back on the core product containing all the super set of functionality required for all verticals/domains thereby leading to inefficiency and high cost.

In some other cases, enterprises are building separate products for different verticals even though there exist many common components in different products. This is a high cost activity because every time a client asks for a change, the product code base has to be changed. Moreover, in most cases, this has to be repeated for all the products if the change is in the common components.

Hence there is a need for a model to build an application layer between the product layer and the solution layer to address the generalized requirements and its solutions for a domain.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concept of the invention in a simplified form as a prelude to the more detailed description that is presented later.

The various embodiments of the present invention provide a PAS model to design and develop software to meet the desired business requirement of each user.

According to one embodiment of the present invention, a product-application-solution (PAS) model for software design and development has a product layer including basic product level business objects (BO) to provide a basic functionality offered by the software. An application layer is built on the product layer and includes the application level business objects that are defined corresponding to each business domain to provide inputs for a solution required by a user and to achieve desired business requirements. A solution layer is built on the application layer and includes the solution level business object to address the specific business requirement of the user and to provide a solution to meet the specific business requirement of the user. The solution level business object is created using the application level business objects which is in turn created using the product level business objects. The solution layer is built on the application layer which is configured and customized to provide solution to meet the specific business requirement of the user.

The solution level business object is created by mapping the application level business objects available at the application layer in the ratio of 1:1 or n:1 or by specializing the application level business objects available at the application layer or by creating a custom business object at the solution layer. The application level business object is created by mapping the product level business objects available at the product layer in the ratio of 1:1 or n:1 or by specializing the product level business objects available at the product layer or by creating a custom business object at the application layer.

The basic product is built at the product layer first while the application layer is built on the product layer and the application layer includes applications for all identified business domains. The solution layer is built on the application layer to provide complete solution to meet the business requirements of plurality of users requiring each application. The complete solution includes application, interfaces to external systems, reports, migration routines, configurations and custom components to meet the requirements and the documents including application manuals, solution definition, solution test cases and reports. The standard application and/or product is changed only when a gap is identified in the application and/or product based on user requirements or market research. The gap is filled up by creating new business objects and adding to the repository of business objects available at the application layer and/or product layer.

According to another embodiment of the present invention, a method is provided for designing and developing software using the PAS model. The requirements of a user are received at a solution layer to model a business process and to prepare the solution level Business Use Cases (BUC). An appropriate application that satisfies the requirements of the customer is identified. The solution level BUCs are passed to an application layer from the solution layer. The received solution level BUCs from the solution layer are analyzed at the application layer to prepare the application level BUCs.

The application level BUCs are forwarded to the product layer from the application layer. The received application level BUCs from the application layer are analyzed at the product layer to prepare the product level BUCs and the product level system use cases (SUC). The product level SUCs are forwarded to the application layer from the product layer. The product level SUCs received from the product layer is analyzed at the application layer to prepare the application level SUCs. The application level SUCs are forwarded to the solution layer from the application layer. The received application level SUCs from the application layer are analyzed at the solution layer to prepare the solution level SUCs. The solution level BUCs and solution level SUCs are used to design software to meet the desired business requirements of the user.

Some of the client requirements are handled at the solution layer itself, because the application features corresponding to the requirements are already available. Such requirements are not moved down to the application and product levels.

In some other times the client requirements are handled at the application level itself because the product features corresponding to the requirements are already available at the application layer. Such requirements are not moved down to the product level. Thus the model identifies a solution for the client requirement in a hierarchical manner. When the solutions are available at one layer itself, then the requirements are not moved down to the other layer/layers.

According to another embodiment, new requirements can come laterally to application and product layer also in the PAS model. That is, new requirements can be triggered from any layer but the solution to the requirements always flow from product to application and then to solution (except in the case of customized requirements). Generally the process flow always starts from the solution layer after the basic product and applications are built. The process flow may start from application layer or even product layer. At any point of time, market research can trigger the enhancement of application/ product by adding new features (business objects) at respective layers. A new application (which was not identified initially) can be built at the application layer. The triggering point of building the new application can be a client request or market research by the product development company.

In general the PAS model is operated as follows. A product is built first. Then the applications for all identified domains are built on top of the product. A matching application corresponding to the received requirement is identified. Then a gap between the client requirements and the identified matching application, if any is identified. Then the application and/or product is enhanced to fill the gap. Only in this case, the requirements go down to application layer and/or product layer.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

Figure 1:
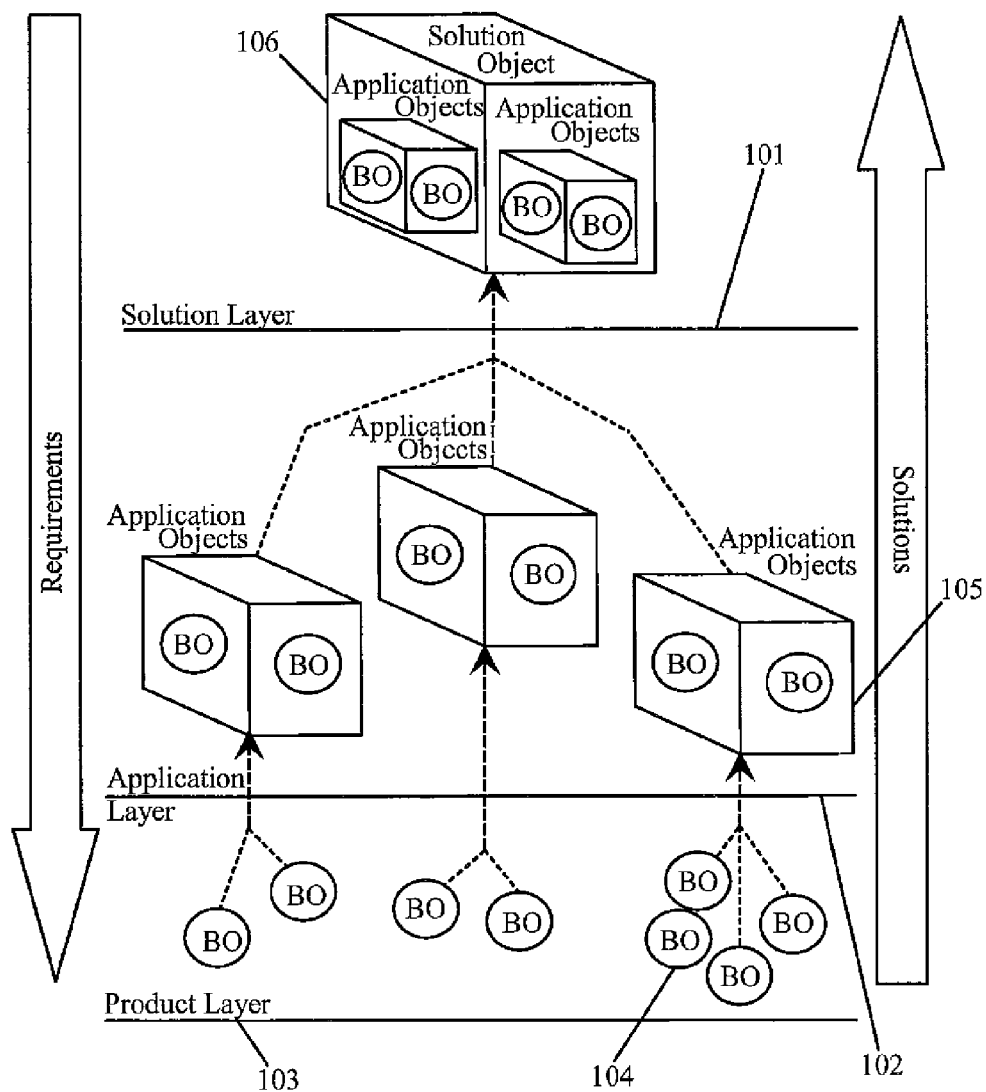
FIG. 1 illustrates a functional block diagram of a high level architecture of PAS model according to one embodiment of the present invention.

Although specific features of the present invention are shown in some drawings and not in others. This is done for convenience only as each feature may be combined with any or all of the other features in accordance with the present invention.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The various embodiments of the present invention provide a PAS model to design and develop software to meet the desired business requirement of each user.

According to one embodiment of the present invention, a product-application-solution (PAS) model for software design and development has a product layer including basic product level business objects (BO) to provide a basic functionality offered by software. An application layer is built on the product layer and includes the application level business objects that are defined corresponding to each business domain to provide inputs for a solution required by a user and to achieve desired business requirements. A solution layer is built on the application layer and includes the solution level business object to address the specific business requirement of the user and to provide a solution to meet the specific business requirement of the user. The solution level business object is created using the application level business objects which is in turn created using the product level business objects. The solution layer is built on the application layer which is configured and customized to provide solution to meet the specific business requirement of the user.

The solution level business object is created by mapping the application level business objects available at the application layer in the ratio of 1:1 or n:1 or by specializing the application level business objects available in the application layer or by creating a custom business object at the solution layer. A solution level business object is created directly from an application level business object in the 1:1 mapping process, while a solution level business object is created by combining two or more application level business objects in the n:1 mapping process. A specialized business object is created at the solution layer by tailoring the behavior of the application level business objects to suit the exact user requirements. A custom business object is created at the solution layer, when the requirement is not generalized for a domain and the application level BO corresponding to the requirement is not available.

An application level business object is created by mapping the product level business objects available at the product layer in the ratio of 1:1 or n:1 or by specializing the product level business objects available at the product layer or by creating a custom business object at the application layer. The application level business object is created directly from a product level business object in the 1:1 mapping process, while the application level business object is created by combining two or more product level business objects in the n:1 mapping process. The specialized application level business object is created by tailoring the behavior of the product level business objects to suit the exact application requirements. A custom business object is created at the application layer, when the requirement is not generalized at the product level and the product level business object corresponding to the requirement is not available.

The basic product is built at the product layer first while the application layer is built on the product layer and the application layer includes separate applications for all identified business domains. The solution layer is built on the application layer to provide complete solution to meet the business requirements of plurality of users requiring each application. The complete solution includes application, interfaces to external systems, reports, migration routines, configurations and custom components to meet the requirements and the documents including application manuals, solution definition, solution test cases and reports. The standard application and/or product is changed only when a gap is identified in the application and/or product based on user requirements or market research. The gap is filled up by creating new business objects and adding to the repository of business objects available at the application layer and/or product layer. A custom business object, which is created in the application layer/the product layer and only utilized in meeting the current user requirement or an application specific requirement, is not added to the repository of business objects at application layer and product layer. A new application (which was not identified initially) can be built at the application layer. The triggering point of building the new application can be a client request or market research by the product development company.

After developing software (product, applications and client implementations) based on PAS model, business objects & business processes can be added at product/application layers at any point of time. It is not required that the trigger for creating new business objects should always comes from the solution layer based on client requirements. Based on market research, the software built (product and applications) can be enhanced by creating new business objects.

According to another embodiment of the present invention, a method is provided for designing and developing software using PAS model. The requirements of a user are received at a solution layer to model a business process and to prepare the solution level business use cases (BUC). An appropriate application that satisfies the requirements of the customer is identified. The solution level BUCs are passed to an application layer from the solution layer. The received solution level BUCs from the solution layer are analyzed at the application layer to prepare the application level BUCs. The application level BUCs are forwarded to the product layer from the application layer. The received application level BUCs from the application layer are analyzed at the product layer to prepare the product level BUCs and the product level system use cases (SUC). The product level SUCs are forwarded to the application layer from the product layer. The product level SUCs received from the product layer is analyzed at the application layer to prepare the application level SUCs. The application level SUCs are forwarded to the solution layer from the application layer. The received application level SUCs from the application layer are analyzed at the solution layer to prepare the solution level SUCs. The solution level BUCs and solution level SUCs are used to design software to meet the desired business requirements of the user.

Some of the client requirements are handled at the solution layer itself, because the application features corresponding to the requirements are already available. Such requirements are not moved down to the application and product levels.

In some other times the client requirements are handled at the application level itself because the product features corresponding to the requirements are already available at the application layer. Such requirements are not moved down to the product level.

Thus the model identifies solution for the client requirement in a hierarchical manner. When the solutions are available at one layer itself, then the requirements are not moved down to the other layer/layers.

When a new client is acquired, a Solutions team specific to the client is formed with roles such as Solution Analyst and Solution Architect. Solution team works at the Solution layer of PAS model. Solution analyst analyses the requirements, and finds out the suitable application that matches the client requirements. Analyst then performs the gap analysis by comparing the client requirements with the features already available in the application. Gap analysis can give rise to the following scenarios:

Case 1: Application features are available—In this case, Solution analyst specializes the application features at the solution layer and creates Solution level BUCs, SUCs and Solution Definition Documents. These artifacts are given to Solution Architect for designing and implementing the solution.

Case 2: Application features are not available, but Product features are available—In this case, Solution analyst analyses the requirements, models the business processes and prepare Business Use Cases (BUC) and then passes on the requirements and BUCs to Application analyst operating at the Application layer of the domain. Application analyst generalizes the requirement from the client for the domain. He then modifies the existing Application Requirement Definitions, BUCs and SUCs or creates new Requirement Definitions, BUCs and SUCs to incorporate the new generalized requirement. Artifacts are then passed on to the Application architect for designing and implementing the requirement in the Application. After incorporating the change in the Application, Application layer notifies the same to Solution layer and process flow in Case 1 is executed.

Case 3: Application and Product features are not available—In this case, Solution analyst analyses the requirements, models the business processes and prepare Business Use Cases (BUC) and then passes on the requirements and BUCs to Application analyst operating at the Application layer of the domain. Application analyst generalizes the requirement from the client for the domain. Application Analyst then modifies the existing Application Requirements and BUCs or creates new Requirement Definitions and BUCs. Since product features are not available for this generalized requirement, the requirements and BUCs are passed on the Product analyst. Product analyst generalize the requirement at the product level. Analyst then modifies the existing Product Requirement Definitions, BUCs and SUCs or creates new Requirement Definitions, BUCs and SUCs. These artifacts are then passed on to Product Architect for designing and implementing the requirement in the Product. After incorporating the change in the Product, Product layer notifies the same to Application layer and process flow in Case 2 is executed.

Case 4—There may be cases where requirements are not taken for generalization at Application/Product layers due to variety of reasons like effort and time required to do the generalization. This is taken up as customizations at appropriate levels.

Thus the PAS model executes 4 different workflows when a user requirement is received at the solution layer. But according to PAS model, an available pre-packaged application is provided to the user without changing the application/product significantly. The success of the model is that the process flow is not brought down to application/product level each time a user asks for a change/requirement.

The BUCs are generated to denote the desired business requirement of the user in a business domain. The SUCs are generated to denote the system processes to be executed to obtain the solution to the desired business requirement. The software is changed at the product level based on the product level BUCs and SUCs before forwarding SUCs to the next level. The software is changed at the application level based on the application level BUCs and SUCs before forwarding SUCs to the next level. The application level and product level software changes required for implementing the solution requirements are designed with the help of application level and product level BUCs and SUCs.

The process flow is not brought down to application or product levels respectively, when the application and the product level BUCs and SUCs are already available corresponding to a requirement i.e. when the user requirement is already addressed at the application layer or product layer respectively. The BUCs and the SUCs are customized at the solution levels and the application levels, when the requirements are not generalized.

FIG. 1 illustrates a functional block diagram of a high level architecture of PAS model according to one embodiment of the present invention. With respect to FIG. 1, the product layer 103 contains the generic services or base functionality that is used by the Application layer 102 or the Solution layer 101. The Product level Business Objects (BO), 104 which forms the product layer 103, includes the base functionality that is provided by the software.

The Product objects 104 provide the services and the state that are used by other layers, to achieve the desired functionality. The state of the business objects 104 in the product layer 103 represents the underlying data in the relational data store. The services (methods in the BO) provide the base functionality of the business object. The examples of BO's 104 at the product layer 103 include customer, account, discounts, voucher, etc in case of a financial transaction.

The application layer 102 defines the services offered by the product to different business domains. The Business objects 105 at the Application layer 102 are created by combining the business objects 104 available at the product layer 103 or by specializing the business object 104 available at the product layer 103. The application level business objects 105 supply the inputs required by the solution layer 101. Application layer 102 provides the application and documents specific to the application for each business domain.

Based on customer driven or market driven requirements from a business domain, new business objects 105 are defined at the application layer 102. These business objects 105 are built from the business objects 104 at the product layer 103 and outlines how the corresponding business function is achieved. These business objects 105 are extended to other verticals if applicable. In short, the application layer 102 offers a "single window" of the features offered for a business domain.

An application level business object 105 is created by mapping the product level business objects 104 available at the product layer 103 in the ratio of 1:1 or n:1 or by specializing the product level business objects 104 available at the product layer 103 or by creating a custom business object 105 at the application layer 102. The application level business object 105 is created directly from a product level business object 104 in the 1:1 mapping process, while the application level business object 105 is created by combining two or more product level business objects 104 in the n:1 mapping process. The specialized application level business object 105 is created by tailoring the behavior of the product level business objects to suit the exact application requirements. A custom business object 105 is created at the application layer 102, when the requirement is not generalized at the product level and the product level business object 104 corresponding to the requirement is not available.

The solution layer 101 provides a solution to a client to meet the individual business requirements. The solution layer 101 is built on the application layer 102 and includes the complete solution to meet the business requirements of the client. The complete solution includes: application; interfaces to external systems—Incoming and Outbound; reports (custom); migration routines; configurations and custom components to meet the requirements; documents (application manuals, solution definition, solution test cases and reports etc.).

The solution provided to each customer is varied based on the process flows used/interfaces/detailed features used etc.

In other words, the application layer 102 is configured and customized to meet the requirements of a solution. The customizations are carried out as add-ons to the application.

The solution definition process starts with the requirement definition stage. The solution is finalized and elaborated as the requirement analysis is completed. The solution approach and architecture are defined initially to identify the gaps in finding a solution to meet the desired business requirements. The solution definition is further elaborated with the finalization specifications for enhancements and customizations.

The solution definition document fully describes the solution offered to a customer. This is a customer specific document. The document is structured based on the different process flows required for meeting the business requirements. The process as implemented in the product is described with the required references to meet the business requirements.

A solution layer 101 is built on the application layer 102 and includes the solution level business object 106 to address the specific business requirement of the user and to provide a solution to meet the specific business requirement of the user. The solution level business object 106 is created using the application level business objects 105 which is in turn created using the product level business objects 104. The solution layer 101 is built on the application layer 102 which is configured and customized to provide solution to meet the specific business requirement of the user.

The solution level business object 106 is created by mapping the application level business objects 105 available at the application layer 102 in the ratio of 1:1 or n:1 or by specializing the application level business objects 105 available in the application layer 102 or by creating a custom business object 106 at the solution layer 101. A solution level business object 106 is created directly from an application level business object 105 in the 1:1 mapping process, while a solution level business object 106 is created by combining two or more application level business objects 105 in the n:1 mapping process. A specialized business object 106 is created at the solution layer 101 by tailoring the behavior of the application level business objects 105 to suit the exact user requirements. A custom business object 106 is created at the solution layer 101, when the requirement is not generalized for a domain and the application level BO 105 corresponding to the requirement is not available.

The basic product is built at the product layer 103 first while the application layer 102 is built on the product layer 103 and the application layer 102 includes separate applications for all identified business domains. The solution layer 101 is built on the application layer 102 to provide a complete solution to meet the business requirements of plurality of users requiring each application. The complete solution includes application, interfaces to external systems, reports, migration routines, configurations and custom components to meet the requirements and the documents including application manuals, solution definition, solution test cases and reports. The standard application and/or product is changed only when a gap is identified in the application and/or product based on user requirements or market research. The gap is filled up by creating new business objects and adding to the repository of business objects available at the application layer 102 and/or product layer 103. A custom business object, which is created in the application layer 102/the product layer 103 and only utilized in meeting the current user requirement or an application specific requirement, is not added to the repository of business objects at application layer 102 and product layer 103.

Figure 2:
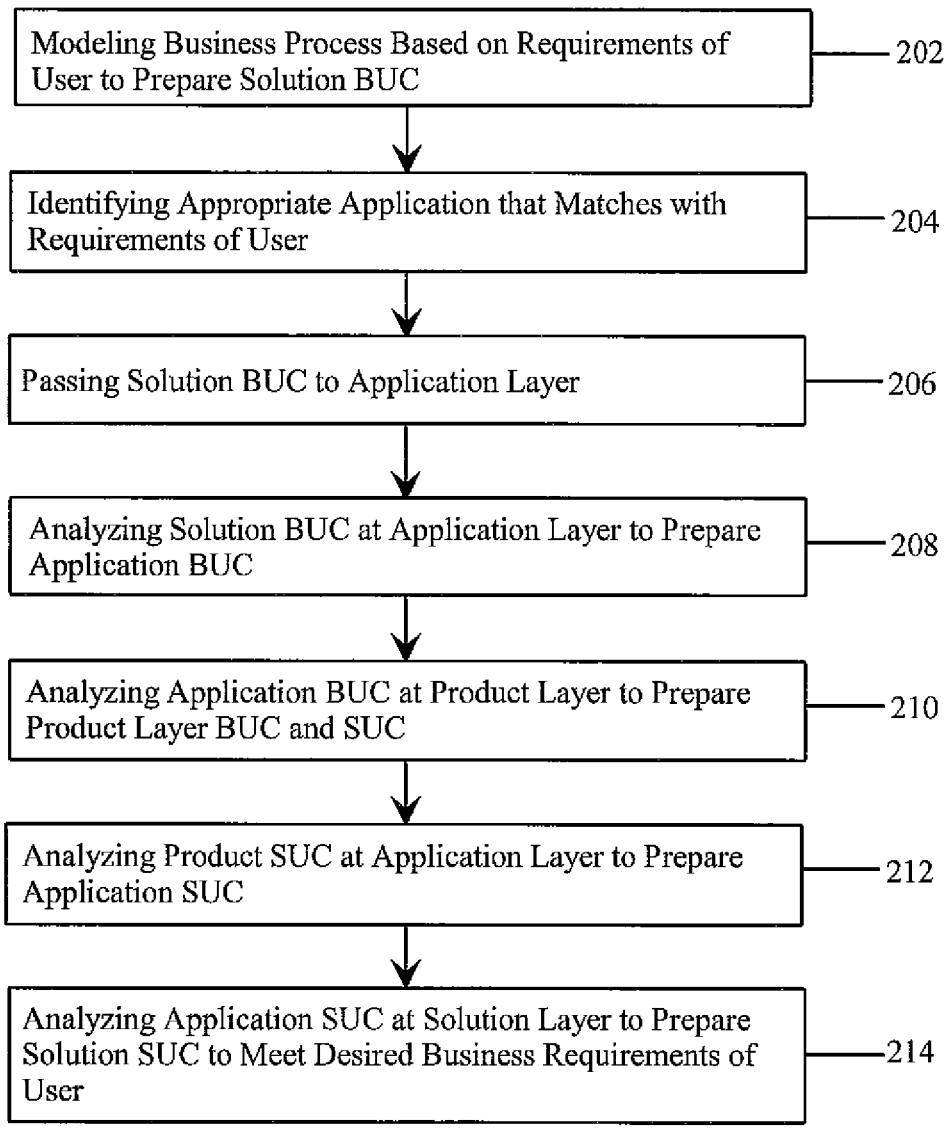
FIG. 2 illustrates a flow chart explaining the operation of PAS model according to one embodiment of the present invention.

FIG. 2 illustrates a flow chart explaining the operation PAS model according to one embodiment of the present invention.

With respect to FIG. 2, a method is provided for designing and developing software using PAS model. The requirements of a user are received at a solution layer to model a business process and to prepare the solution level business use cases (BUC) (202). An appropriate application that satisfies the requirements of the customer is identified (204). The solution level BUCs are passed to an application layer from the solution layer (206). The received solution level BUCs from the solution layer are analyzed at the application layer to prepare the application level BUCs (208). The application level BUCs are forwarded to the product layer from the application layer. The received application level BUCs from the application layer are analyzed at the product layer to prepare the product level BUCs and the product level system use cases (SUC) (210). The product level SUCs are forwarded to the application layer from the product layer. The product level SUCs received from the product layer is analyzed at the application layer to prepare the application level SUCs (212). The application level SUCs are forwarded to the solution layer from the application layer. The received application level SUCs from the application layer is analyzed at the solution layer to prepare the solution level SUCs. The solution level BUCs and solution level SUCs are used to design software to meet the desired business requirements of the user (214). FIG. 2 explains the case where some of the client requirements are not handled at the application and product layers. For the requirements which are handled at the application and/or product levels, process flow is not brought down to application and/or product levels respectively.

The BUCs are generated to denote the desired business requirement of the user in a business domain. The SUCs are generated to denote the system processes to be executed to obtain the solution to the desired business requirement. The software is changed at the product level based on the product level BUCs and SUCs before forwarding SUCs to the next level. The software is changed at the application level based on the application level BUCs and SUCs before forwarding SUCs to the next level. The application level and product level software changes required for implementing the solution requirements are designed with the help of application level and product level BUCs and SUCs.

It is not mandatory that the process flow always starts from the solution layer after basic product and applications are built. It can start from application layer or even product layer. At any point of time, based on market research, application/product can be enhanced by adding new features (business objects) at respective layers.

The process flow is not brought down to application or product levels respectively, when the application and the product level BUCs and SUCs are already available corresponding to a requirement i.e. when the user requirement is already addressed at the application layer or product layer respectively. The BUCs and the SUCs are customized at the solution levels and the application levels, when the requirements are not generalized.

The detailed process flow (for the requirements which need application and product changes) happening at each layer is explained below: When a new client is acquired, the specialist at the solution layer analyses the requirements, models the business processes and prepares the Business Use Cases (BUC).

The BUCs are then passed on to the Application layer. The analyst at the application layer analyses the BUCs provided by the solution layer and tries to generalize the business processes for the domain. The analyst then prepares the Application level BUCs. The Application level BUCs are passed on to the product layer. The analyst at the product layer tries to generalize application level business processes in the product. The analyst then prepares the product level BUCs and SUCs (System Use Cases). The Product level BUCs and SUCs are the input for the architect who designs and implements the requirements in the product.

After including the requirements in the product, the product layer notifies the same to the application layer. The Product SUCs are passed on to the application layer. The analyst at the application layer understands how the requirement is handled in the product using the SUCs and then creates the Application level SUCs by specializing the same for a domain. The Application level BUCs and SUCs are the input for the architect who designs and implements the requirements in the application.

After including the requirements in the application, the application layer notifies the same to the Solution layer. The Application SUCs are passed on to the solution layer. The analyst at the solution layer understands how the requirement is handled in the application using the SUCs and then creates Solution level SUCs by specializing the same for a client based on their exact requirements. The solution level BUCs and SUCs are the input for the architect who designs and implements the requirements in the solution delivered to the client.

When some of the client requirements are handled at the solution layer due to the availability of the application features corresponding to the requirements already in the solution layer, such requirements are not passed down to the application and product levels.

When another set of requirements are handled at the application level due to the availability of the product features corresponding to the requirements already in the application layer, such requirements are not passed down to the product level. This is the most important benefit of PAS model as the domain specific changes are handled at the application layer with out interacting with the product layer.

Figure 3:
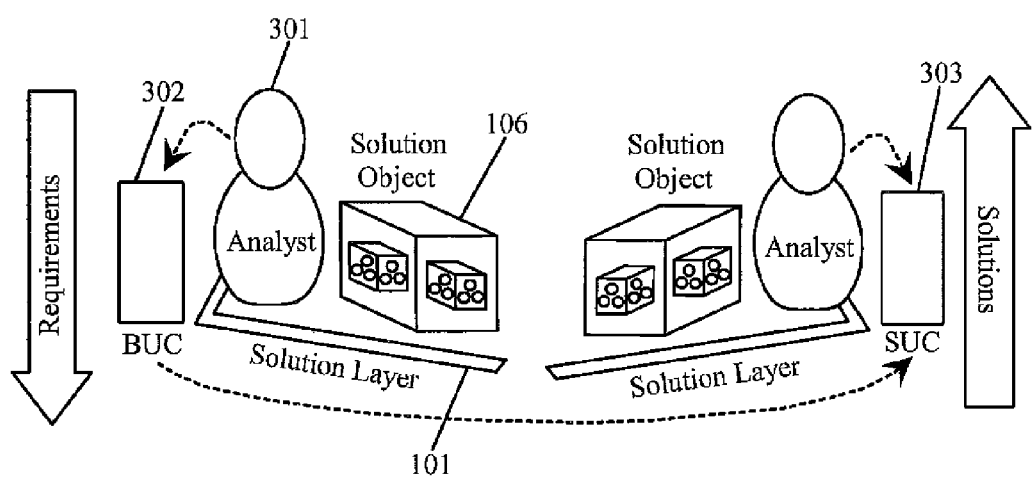
FIG. 3 illustrates a process flow in the PAS model according to one embodiment of the present invention, when application features are available.

FIG. 3 illustrates a process flow in the PAS model according to one embodiment of the present invention, when application features are available. When a new client is acquired, a Solutions team specific to the client is formed with roles such as Solution Analyst 301 and Solution Architect. Solution team works at the Solution layer 101 of PAS model. Solution analyst 301 analyses the requirements, and finds out the suitable application that matches the client requirements. Analyst 301 then performs the gap analysis by comparing the client requirements with the features already available in the application. Gap analysis can give rise to the following scenarios:

Case. 1: when the application features are available, Solution analyst 301 specializes the application features at the solution layer 101 and creates Solution level BUCs 302, SUCs 303 and Solution Definition Documents. These artifacts are given to Solution Architect for designing and implementing the solution.

Figure 4:
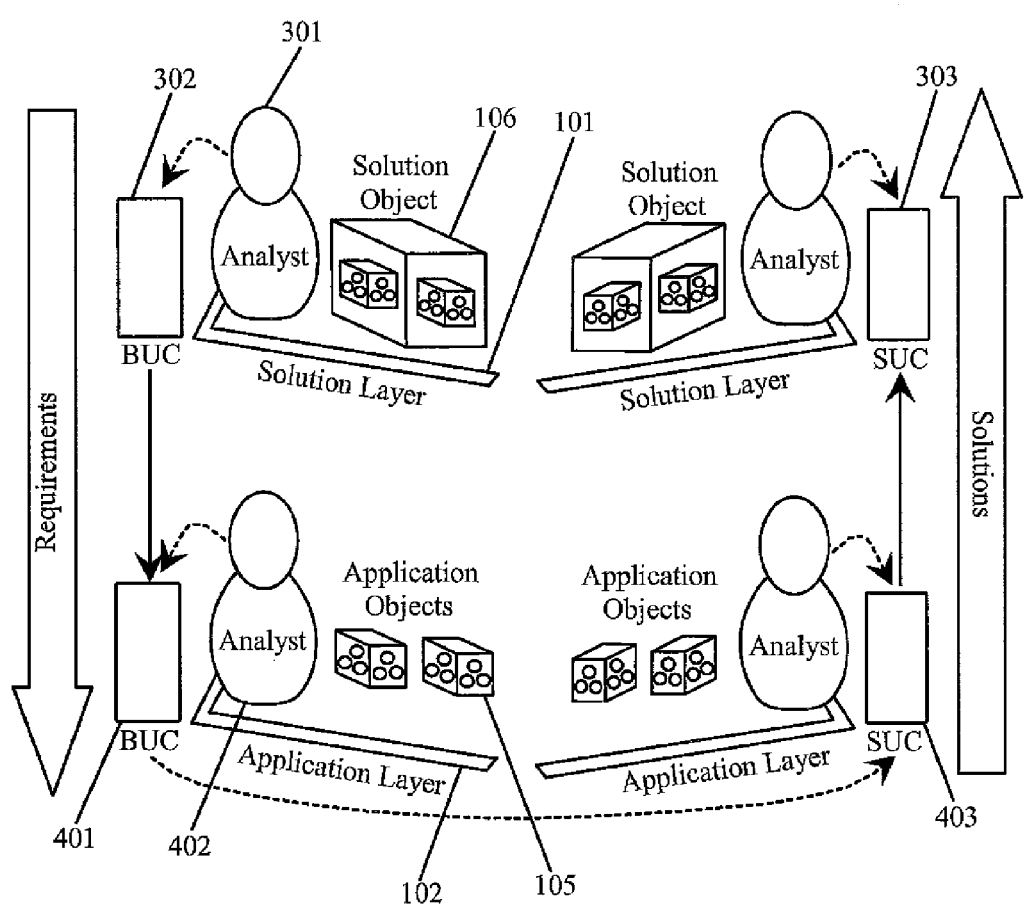
FIG. 4 illustrates a process flow in the PAS model according to one embodiment of the present invention, when application features are not available but product features are available.

FIG. 4 illustrates a process flow in the PAS model according to one embodiment of the present invention, when application features are not available but product features are available. Case 2: Application features are not available, but Product features are available—In this case, Solution analyst 301 analyses the requirements, models the business processes and prepare Business Use Cases (BUC) 302 and then passes on the requirements and BUCs 302 to Application analyst 402 operating at the Application layer 102 of the domain. Application analyst 402 generalizes the requirement from the client for the domain. He then modifies the existing Application Requirement Definitions, BUCs 401 and SUCs 403 or creates new Requirement Definitions, BUCs 401 and SUCs 403 to incorporate the new generalized requirement. Artifacts are then passed on to the Application architect for designing and implementing the requirement in the Application. After incorporating the change in the Application, Application layer 102 notifies the same to Solution layer 101 and process flow in Case 1 is executed.

Figure 5:
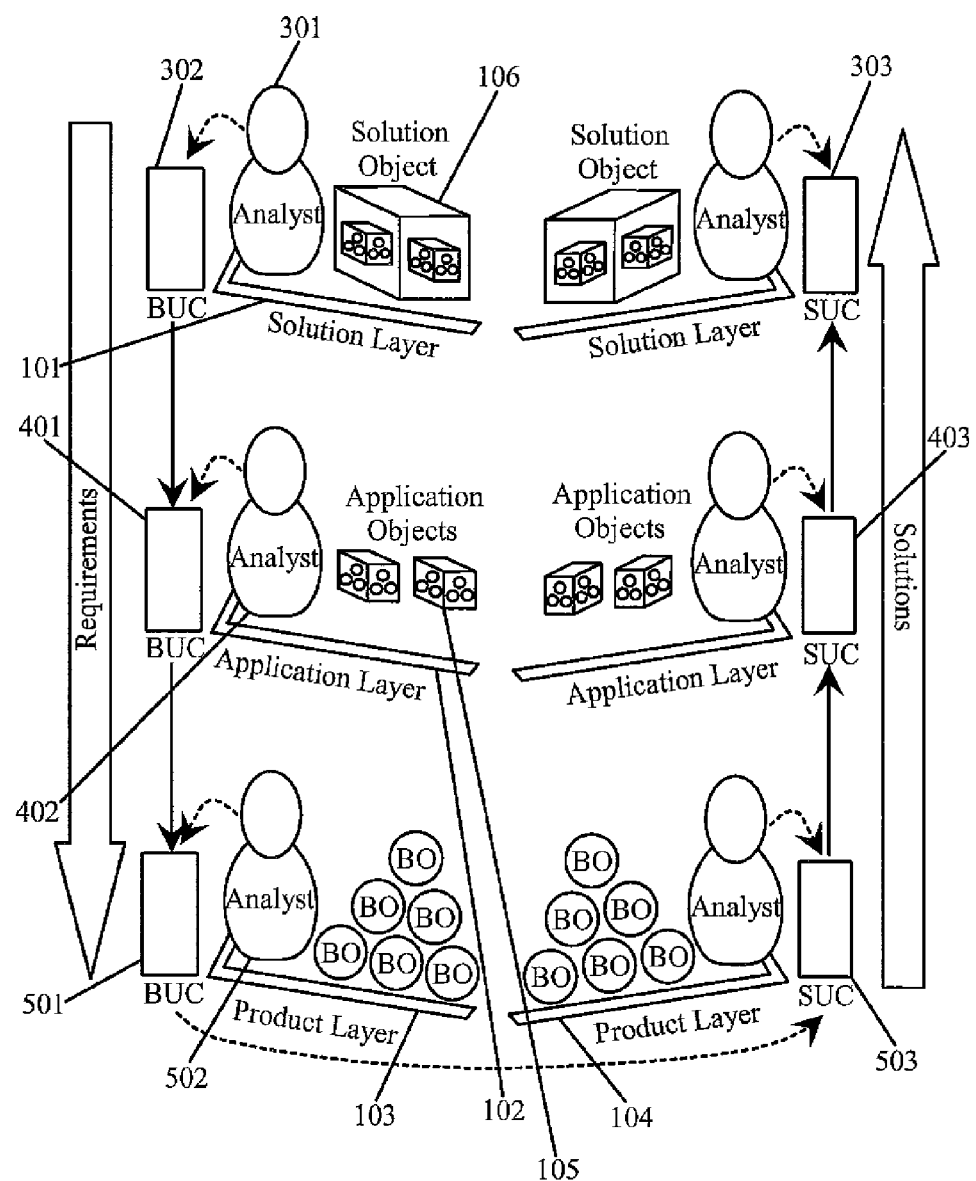
FIG. 5 illustrates a process flow in the PAS model according to one embodiment of the present invention, when application and product features are not available.

FIG. 5 illustrates a process flow in the PAS model according to one embodiment of the present invention, when application and product features are not available. Case 3: Application and Product features are not available—In this case, Solution analyst 301 analyses the requirements, models the business processes and prepare Business Use Cases (BUC) 302 and then passes on the requirements and BUCs 302 to Application analyst 402 operating at the Application layer 401 of the domain. Application analyst 402 generalizes the requirement from the client for the domain. Application Analyst 402 then modifies the existing Application Requirements and BUCs 401 or creates new Requirement Definitions and BUCs 401. Since product features are not available for this generalized requirement, the requirements and BUCs 401 are passed on the Product analyst 502. Product analyst 502 generalizes the requirement at the product level. The Product Analyst 502 then modifies the existing Product Requirement Definitions, BUCs 501 and SUCs 503 or creates new Requirement Definitions, BUCs 501 and SUCs 503. These artifacts are then passed on to Product Architect for designing and implementing the requirement in the product. After incorporating the change in the product, Product layer 103 notifies the same to Application layer 102 and process flow in Case 2 is executed.

Case 4—There may be cases where requirements are not taken for generalization at Application/Product layers due to variety of reasons like effort and time required to do the generalization. This is taken up as customizations at appropriate levels. Thus the PAS model executes 4 different workflows when a user requirement is received at the solution layer.

The various advantages or the special features of PAS model are explained below: The codes, documents and test cases are reusable. The re usability is the main advantage of the PAS model. The code base at the product level is re-used across all levels in the layered model. Only specializations based on the specific business validations are required at application/solution levels. All the documents written at the product level are re-used at higher levels and required modifications are made to meet the business requirements. The product level business objects are tested at the product layer. At application/solution layers, the specialized business objects are tested based on the business requirements of domain/client.

The specific requirements from different solutions get generalized at the application layer to encompass all dimensions of a domain. In the absence of application layer, the effort required to implement the requirements at solution layer for different domains/clients is high.

The PAS model avoids the duplication of work at each layer. In the absence of application layer, each solution has to directly interact with the product for packaging the solution and implementing the changes. In the process, the product team ends up doing all tasks repetitively for each customer for different domains. The packaging at the application layer reduces such inefficient and redundant works.

The application layer takes away the complexity existing at the product layer with regard to the business requirements for each domain. Hence the product layer is able to concentrate on strengthening the product level business objects so that other layers meet their business requirements by customizing the business objects at appropriate levels.

The PAS model calls for different roles and responsibilities at each layer. The requirements flow from the top layer to the bottom layer while the solutions flow from the bottom layer to the top layer. The application layer is expected to reduce the effort required to communicate between the solution layer and product layer both in terms of requirement flow and solution flow.

The PAS model reduces the implementation time frame. In the absence of application layer, the difference between the solution layer and product layer is large and hence requires more time and effort for implementing the product for each client. In the PAS model, the application layer is expected to be very close to the solution layer. When an application with a solution is already available, it significantly reduces implementation time and effort.

The PAS model enables the easy maintenance of complex software. The complex software catering to requirements of different domains are easily handled in the PAS model. Application layer takes care of each domain, thereby reducing the complexity of the software. The layered architecture and versioned business objects/components at appropriate levels ensures easy maintenance of all activities from development to implementation of the software.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

It is also to be understood that the following claims are intended to cover all of the generic and specific features of the present invention described herein and all the statements of the scope of the invention which as a matter of language might be said to fall there between.

What is claimed is:

1. A non-transitory storage medium stored with instructions that are executed in a computer device for generating a model for software design comprising:
   product layer comprising a plurality of basic product software coded executable business objects each providing basic software functionality, the business objects stored and retrievable by code executed by a processor of a computer appliance from a non-transitory physical medium;
   an application layer comprising application business objects created based on product business objects and by the code executed by the processor from instances of the basic product business objects each corresponding to a specific business domain; and a solution layer comprising a solution business object combining by the code executed by the processor, individual ones of the application-level business objects, creating a software suite fulfilling specific business requirements of a user;
   wherein the solution layer business object is created using the application layer business objects which are in turn created using the product layer business objects and the solution layer is built on the application layer which is configured and customized to provide solution to meet the specific business requirements of the user; and wherein a standard application and/or product is changed only, when a gap or difference is identified in the application and/or product based on user requirements or market research and wherein the gap or difference is filled by creating new business objects and adding to a repository of business objects available at the application layer and/or product layer; and wherein a solution for a client requirement is identified in a hierarchical manner, and wherein a client requirement is moved in a hierarchical manner to a plurality of layers to identify the solution for the client requirement in the hierarchical manner, and wherein a client requirement is not moved to the other layers, when a solution is available at one layer itself and\wherein a client requirement is not moved to the application layer and product layer, when an application feature corresponding to the client requirement is available at the solution layer itself and wherein a client requirement is not moved to the product layer, when a product feature corresponding to the client requirement is available at the application layer itself;

wherein a new requirement is triggered at the application layer or product layer or solution layer wherein the basic product is built at the product layer first while the application layer is built on the product layer and the application layer includes separate applications for all identified business domains;

wherein the solution layer is built on the application layer to provide a complete solution to meet business requirements of a plurality of users requiring each application; and wherein the complete solution includes application, interfaces to external systems, reports, migration routines, configurations and custom components to meet requirements and the documents include application manuals, solution definition, solution test cases and reports.

2. The model according to claim 1, wherein solution business objects are created by mapping with the application business objects available at the application layer or by specializing the application business objects available in the application layer or by creating a custom business object at the solution layer.

3. The model according to claim 2, wherein the mapping between application business objects and solution business objects follow the ratio 1:1 or n:1 and a solution business object is created directly from an application business in the mapping process, while a solution business object is created by combining two or more application business objects in the n:1 mapping process.

4. The model according to claim 2, wherein a specialized business Object is created at the solution layer by tailoring behavior of application business objects to suit exact user requirements.

5. The model according to claim 2, wherein a custom business object is created at the solution layer, when the requirement is not generalized for a domain and the application business object corresponding to the requirement is not available.

6. The model according to claim 1, wherein an application business object is created by mapping with the product business objects available at the product layer or by specializing the product business objects available at the product layer or by creating a custom business object at the application layer.

7. The model according to claim 6, wherein the mapping between product business objects and application business objects follows the ratio 1:1 or n:1 and an application business object is created directly from a product business object in the 1:1 mapping process, while an application business object is created by combining two or more product business objects in the n:1 mapping process.

8. The model according to claim 6, wherein the specialized application business object is created by tailoring behavior of the product level business objects to suit exact application requirements.

9. The model according to claim 6, wherein a custom business object is created at the application layer, when the requirement is not generalized at the product layer and the product business object corresponding to the requirement is not available.

10. A method for designing and developing software, the method comprising:

executing code by a processor of a computer appliance from a non-transitory physical medium, the code providing a process;

receiving requirements of a user at a solution layer to model a software-coded business process and preparing solution level business use cases;

determining an application that matches with the requirements of the user identifying a difference between the user requirements and requirements already provided by the application;

passing the solution level business use cases to all application layer from the solution layer to fill the difference between requirements provided by the application and the user requirements;

analyzing the received solution level business use cases from the solution layer at the application layer to prepare application level business use cases;

forwarding the application level business use cases to a product layer from the application layer to fill the gap difference between product and application requirements;

analyzing the received application level business use cases from the application layer at the product layer to prepare product level business use cases and product level system use cases;

forwarding the product level system use cases to the application layer from the product layer, analyzing the received product level system use cases from the product layer at the product layer at: the application layer to prepare application level system use cases;

forwarding the application level system use cases to the solution layer from the application layer; and analyzing the received application level system use cases from the application layer at the solution layer to prepare the solution level system use cases;

wherein a standard application and/or product is changed only when a gap or difference is identified in the application and/or product based on user requirements or market research, and wherein the gap or difference is filled by creating new business objects and adding to a repository of business objects available at the application layer and for product layer; and wherein a solution for a client requirement is identified in a hierarchical manner, and wherein a client requirement is moved in a hierarchical manner to a plurality of layers to identify the solution for the client requirement in the hierarchical manner, and wherein a client requirement is not moved to the other layers, when a solution is available at one layer itself and wherein a client requirement is not moved to the application layer and product layer, when an application feature corresponding to the client requirement is available at the solution layer itself and wherein a client requirements not moved to the product layer, when a product feature corresponding to the client requirement is available at the application layer itself; and wherein a new requirement is triggered at the application layer or product layer or solution layer.

11. The method according to claim 10, wherein the business use cases are generated to denote a desired business requirement of a user in business domain.

12. The method according to claim 10, wherein the system use cases are generated to denote the system processes to be executed to obtain the solution to a desired business requirement.

13. The method according to claim 10 further comprising changing the software at the product level based on the product level business use cases and system use cases to fill the difference between product and application requirements before forwarding system use cases to the next level.

14. The method according to claim 10, further comprising changing the software at the application level based on the application level business use cases and system use cases to fill the difference between application and solution requirements before forwarding the system use cases to the next level.

15. The method according to claim 10, wherein application level and product level software changes required for implementing solution requirements are designed with the help of application level and product level business use cases and system use cases.

16. The method according to claim 10, wherein the process flow is not brought down to application or product levels respectively, when the application and the product level business use cases and system use cases are already available corresponding to a requirement.

17. The method according to claim 10, wherein business use cases and the system use cases are customized at the solution levels and the application levels, when the requirements are not generalized.

* * * * *